Patented Aug. 22, 1944

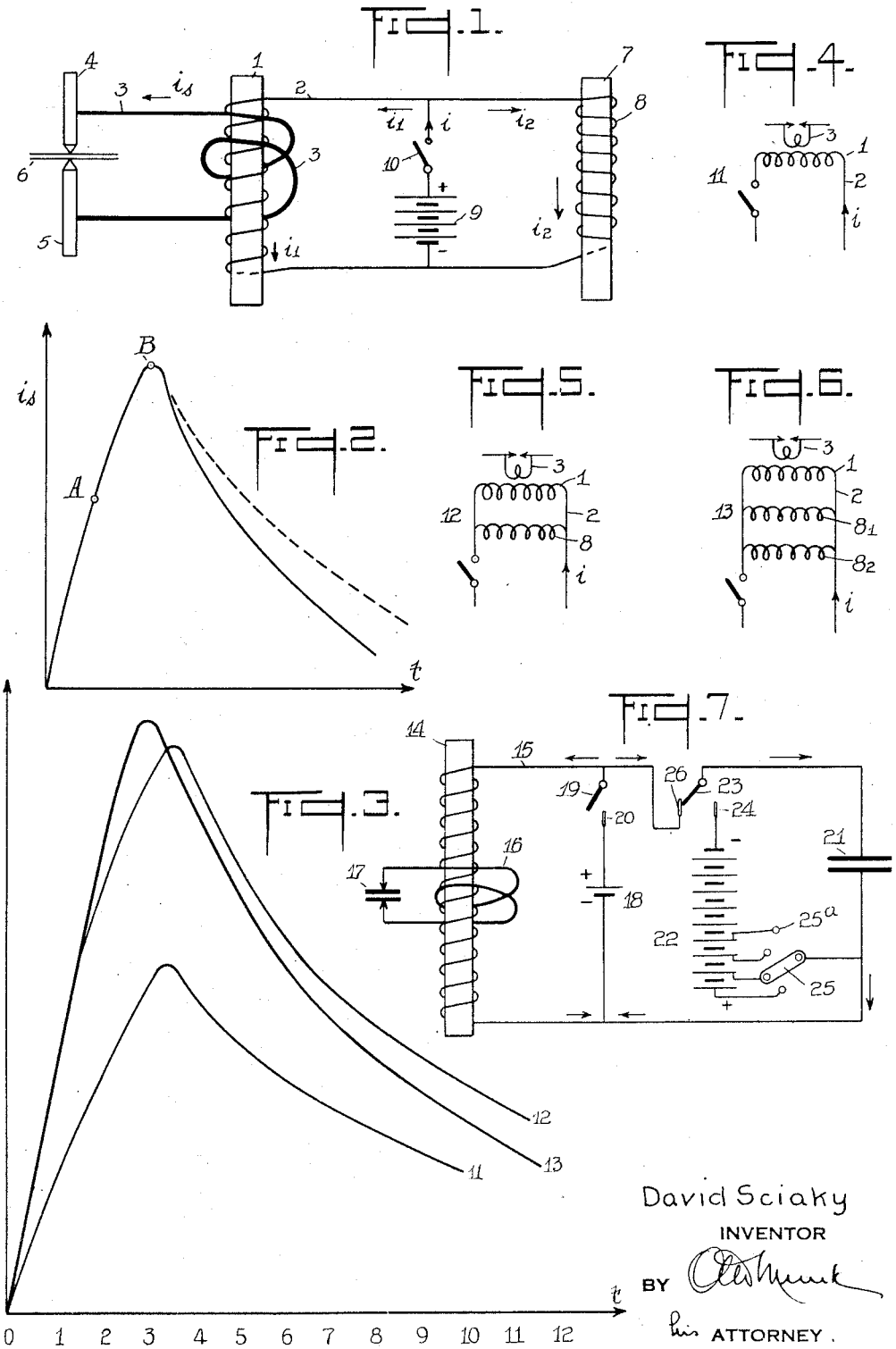

2,356,621

UNITED STATES PATENT OFFICE 2,356,621

PROCESS AND MACHINE FOR WELDING BY ELECTROMAGNETIC STORAGE OF ENERGY

David Sciaky, Paris, France, assignor to Welding Research, Inc., Chicago, Ill., a corporation of Illinois Application November 26, 1940, Serial No. 367,236
In France June 4, 1940

6 Claims. (Cl. 219—4)

My invention relates to a method and a machine for welding by resistance, operating by storage of electromagnetic energy.

Machines of this general type comprise, in addition to the usual electrodes and pressure means, a laminated iron core surrounded by primary coils which, when traversed by a direct current serve to magnetize the iron, and one or more secondary windings, the terminals of which are connected to electrodes between which the parts to be welded are held.

Discontinuance of the magnetizing current produces a discharge current in the secondary circuit, which discharge current is used to effect the welding action. The more rapidly the charging current disappears the more rapidly does the discharge current increase, when the connection between the primary winding and the current source is interrupted.

The quantity of electro-magnetic energy stored is proportional to the cross section of the iron core, to the number of windings, to the instantaneous value of the current which traverses them and to the density (induction value) of the resulting magnetic flux.

In these machines the energy stored is thus limited by the magnitude of the masses of iron and of copper which constitute the self-inductance spool.

Beyond a certain value of induction of the iron, the energy stored increases but very little in comparison to the strength of the current employed, by reason of the resulting magnetic saturation of the iron.

Owing to the limited permeability of the iron, large masses of this metal are necessary in order to store appreciable magnetic energy sufficient to weld sheets of present day thickness, especially those of light alloys, the welding of which requires the use of extremely strong currents.

Present day welding machines operated by stored energy thus present the disadvantage of being very heavy and consequently being unsuitable in cases where the machine must be moved lengthwise of the article being welded. The primary object of the present invention is to obviate this disadvantage to a very substantial extent, and another object is to improve the form of the curve of the welding current.

The invention comprises a method of welding with the use of stored electro-magnetic energy, a characteristic of the method being that the energy is stored in an accumulator or storage system and, during the processes of discharge of the system, applying to its terminals an electromotive force of opposite direction, which causes the strength of the current flowing from the storage system to diminish more rapidly and thus to correspondingly increase the strength of the welding current.

In one form of the method of the invention the electromotive force of opposed direction presents a greater value than that of the storage system, so that after the storage system current has fallen to zero it reappears again in opposite direction due to the action of the opposite electromotive force, thus reenforcing the welding current.

The invention also comprises a machine for efficiently and satisfactorily performing welding operations according to the method above defined. The machine of my invention includes a system of electro-magnetic energy storage comprising an iron core, a primary exciting coil and a secondary welding coil, while the electromotive force of opposite direction is supplied by a self-induction coil, the single exciting winding of which is permanently connected to the exciting winding of the storage system and is fed at the same time as the storage system itself from a common source of direct current.

The invention also comprises other features and combinations hereinafter described.

Several forms of the invention are illustrated in the accompanying drawing, in which Fig. 1 is a schematic view of the electrical connections of a machine of my invention.

Fig. 2 is a diagram representing the strength of the welding current in function of time.

Fig. 3 is a comparative diagram representing the strength of the welding current in function of time, in three different forms of circuit connection.

Figs. 4, 5 and 6 are diagrams of these three forms of connection.

Fig. 7 is a diagram of a modified form of welding machine.

Referring to the drawing, 1 is the iron core of the self-induction coil of the welding machine, 2 is the primary or exciting winding of this coil, 3 is its secondary winding, the two ends of which are connected to the electrodes 4 and 5 between which the member 6 to be welded is held.

The second self-induction coil is constituted by the iron core 7 and the exciting winding 8. The two ends of this winding are connected to those of the exciting winding 2. The source of direct current 9 permits of these two windings being fed in parallel through the interrupter 10.

The operation of the device thus described is as follows:

The interrupter 10 is closed. The current $i$ which develops progressively divides into two branches, namely $i_1$ which excites the winding 2 and $i_2$ which excites the winding 8. By suitably calculating the characteristics of the two circuits it is possible to obtain an equal increase of current in the two circuits, that is to say a constant of time of equal charge. The charge being thus obtained, the current is interupted by quickly opening the interrupter 10.

At the instant when the contacts separate, that is to say during the time $dt$ which follows this instant, the resistance of the arc which is formed between these contacts causes the current $i$ and consequently the currents $i_1$ and $i_2$ to diminish.

The result thereof is the presence of electromotive forces (supertensions of rupture) at the terminals of the windins 2 and 8. The electromotive force at the terminals of 8 is greater than that produced at the terminals of 2, since 2 comprises a secondary circuit which tends to absorb the electro-magnetic energy stored in the iron core 1, and the iron core 7 can only have its energy absorbed by its own winding 8.

The windings 2 and 8 will thus be traversed by a circulatory current the value of which represents the difference between the values of $i_1$ and $i_2$, the current $i_1$ being that current which would flow through the winding 2 were that winding not connected to the winding 8. The effect of the opposite electromotive force coming from 8 will thus be to cause the current $i_1$ to diminish more rapidly and the greater the coefficient of the self-inductance of 8 is relatively to the coefficient of the apparent self-inductance of 2, the greater will be the diminution of $i_1$.

During this time, $i_2$ will also diminish, but less rapidly than $i_1$, since the iron core 7 only comprises a single winding and the current $i_1$ will thus be nullified before $i_2$.

Fig. 2 shows the curve of the discharge current $i_s$ in function of time in the secondary welding circuit 3, which current comes into being the moment the two contacts of the interrupter 10 (Fig. 1) are separated. The moment this current attains the value A, the current $i_1$ will have a zero value. From this moment the winding 8 will pass into 2 a current of $i_1'$ of the opposite direction which represents a resultant of the instaneous values of the currents $i_1$ and $i_2$ during the discharge.

This inverse current, the value of which increases, produces in the winding 2 a variation of the magnetic field $$\frac{d\Phi}{dt}$$

of the same direction as that produced initially by the current $i_1$ which disappears. It thus has a tendency to induce in the secondary winding 3 an electromotive force of the same direction and to reenforce the secondary current $i_s$ thus causing the curve to rise to B.

The current $i_1'$ rises to a maximum and then diminishes. The variation $$\frac{d\Phi}{dt}$$

in the winding 2 now becomes negative. The effect of this is to induce in the secondary winding 3 an electromotive force of the opposite direction tending to cause the secondary current to decrease more rapidly. The dotted curve represents the decay which this current would have if the winding 8 had been disconnected at the moment when the current $i_1'$ had commenced to diminish.

Fig. 3 shows three oscillographic curves of the secondary discharge current $i_s$ in function of time $t$ for the following three cases:

The curve 11 corresponds to the case where the winding 8 (Fig. 1) had been disconnected. The charging current has been reduced to a value of 140 amperes (Fig. 4).

The curve 12 was obtained by reconnecting the winding 8. The charging current $i$ being 280 amperes, $i_1$ being 140 amperes, and $i_2$ being 140 amperes (Fig. 5).

The curve 13 was obtained by connecting to the self-inductance 1—2 two self-inductances $8^1$—$8^2$ connected in parallel with the winding 8. The charging current is: $i=280$ amperes uniformly distributed in the three windings (Fig. 6).

Comparison of the curves 11 and 12 will show the large increase of discharge current $i_s$ due to the self-inductance 8.

Notably in the case of the curve 13 it will be seen that the current applied to the winding 2 was 93 amperes only in place of 140. It will also be noted that the increase of the current curve 13 is more rapid than for the curve 12 and the decrease of this current is clearly more rapid.

The invention thus provides means for considerably increasing the welding capacity of an electro-magnetic energy storage machine without increasing the mass of its electro-magnetic circuit. The connection of the additional self-inductances with the self-transformer which is present in the machine may be effected by two simple insulated conductors. The self-inductances may be installed, immovably, in an appropriate corner of the shop while the machine may be moved along the article to be welded.

Due to the present invention, the self-transformer of the machine may be extremely small compared to prior art machines of the same capacity. It is apparent that the addition of a large self-inductance which stores a larger amount of energy than the self-transformer of the machine, permits the attainment of welding currents of an extremely high intensity despite the reduced dimensions of the iron core of the machine. The current $i_1'$ which circulates in an inverse direction in the winding 2, after the disappearance of $i_1$ (Fig. 1) is always accompanied by an increase of secondary current $i_s$ from A to B (Fig. 2.) During this phenomenon, the self-transformer (iron core 1, primary winding 2, secondary winding 3) acts like a true alternating current transformer in which the instantaneous value of the primary ampere turns is substantially equal to that of the secondary ampere turns. To the magnetic field of the primary winding there is thus opposed the magnetic field of the secondary winding, whatever may be the value of the currents which produce them. Although the iron core may have a tendency to become saturated to a certain value by the charging current corresponding to a limited storage of energy, its magnetic state is not practically influenced by the magnitude of the currents $i_1'$ and $i_s$. It is thus possible to produce in the secondary winding 3 a discharge current of an intensity which is a multiple of that which may have permitted the magnetization (for a forcibly limited degree) of the iron core by the simple excitation of the winding 2.

Owing to the reduction of the dimensions of the self-transformer, the frame of the machine may also be of reduced dimensions thus resulting in an important lightening and a very great simplification of the machine.

The prior art machines operating by a storage of electro-magnetic energy also present another disadvantage, namely, the decrease of discharge current follows an exponential law; it is a function of the relation of the inductance of the secondary circuit to the ohmic resistance of this circuit. By reason of the very high intensity of this current, it is always necessary to provide a secondary winding and to provide the conductors which connect it to the electrodes with a section which is also as great as possible, in order to avoid the losses of energy due to the magnitude of this current. But the low resistance of this circuit has a tendency to retard the decrease of the secondary current, which causes prolonged and often injurious heating of the part being welded substantially at the moment when the discharge current attains its maximum value.

The present invention obviates this additional disadvantage. As was shown in connection with the discussion of Figs. 1 and 2, the counter-current $i_1'$, at the moment of its decrease, tends to induce an opposite electromotive force in the secondary winding 3 and to cause the secondary current to disappear more rapidly. The resistance of the additional self-inductance 8, results in accentuating this phenomenon at the end of the operation by reason of the fact that the winding 2 is closed by the winding 8: the latter absorbs, and that only at the end of the operation, a part of the residual energy of the secondary circuit 3 and thus tends to cause the secondary current to disappear more rapidly.

Another manner of carrying the invention into effect is shown schematically in Fig. 7.

The self-transformer of the machine comprises the iron core 14, the exciting winding 15 and the secondary winding 16, the circuit of which is closed by the electrodes of the machine and the object 17 to be welded. A source of direct current 18, of low voltage, excites 15 when the lever of the interrupter 19 is moved onto the fixed contact 20. A high voltage condenser 21 may be charged by an appropriate source of direct current 22 when the lever of the interrupter 23 is brought into contact with the fixed contact 24. This source of direct current (storage battery, alternating current rectifier having multiple elements in series, etc.) is provided with several taps 25ª adjacent the contacts of the commutator 25 to permit of regulating the voltage of the charge of the condenser 21, but the current source may also be a direct current dynamo the voltage of which is adjustable. When the lever 23 is moved onto the fixed contact 26 the condenser 21 is connected to the exciting winding 15 and discharges into this winding, creating a corresponding variation of the magnetic field in the iron core 14 and the formation of a corresponding induced current in the winding 16.

The machine of Fig. 7 operates as follows:

The article 17 to be welded being held between the two electrodes of the machine, the lever 19 is moved onto contact 20 and the lever 23 onto contact 24. The winding 15 is excited by the current source 18 and the condenser 21 is charged by the current source 22.

To effect welding of the article 17, the charging current of the self-inductance is interrupted by the interrupter 19, which permits discharge of electro-magnetic energy through the secondary winding 16 during the collapse of the magnetic field in the iron core 14, accompanied by a supertension at the terminals of the primary winding 15. Simultaneously with the opening of the interrupter 19, the condenser 21 is disconnected from the current source 22 by separating the interrupter lever 23 from the stationary contact 24, and the high voltage of the condenser 21 is applied to the terminals of the winding 15 by connecting 23 with the stationary contact 26.

The voltage of the condenser 21 being of an opposite sign to that of the supertension of the self-induction coil, this current tends to oppose that of the winding 15. The result is a process analogous to that described with reference to Fig. 1 and a considerable reenforcement of the current in the secondary winding 16.

As is the case with the machine shown in Fig. 1, the machine of Fig. 7 is considerably lighter than comparable prior art machines and its welding capacity is greatly increased. The battery of condensers with the sources of current may be installed, immovably, in a corner of the shop and it suffices to connect the assembly with the machine by means of two simple insulated conductors.

Other forms of the invention than those described by way of example may be employed without departing from the spirit of the invention.

The principal advantages achieved by the present invention are the following:

1. Very substantial reduction of the masses of copper and of iron of the self-transformer used in the welding machine.

2. Reduction of the frame enclosing the self-transformer and considerable lightening and simplification of the machine which is thus made readily transportable.

3. Possibility of production of extremely intense welding currents in a machine of reduced dimensions, owing to the provision of the self-inductance or of the separate condensers, permitting the storage of considerable quantities of electro-magnetic or electrostatic energy.

4. Improvement of the welding curve, notably by the rapid decrease of this current, avoiding the injurious heating of the zone of metal around the welding.

What I claim is:

1. In a method for resistance welding with a welding current induced by interruption of a circuit supplying a current to an electromagnetic storage system, the step of applying to the terminals of said storage system, upon interruption of the supply circuit, an electromotive force opposite to the electromotive force of the storage system to accelerate the diminution of the current flowing in the storage system thereby shortening the time interval required by the welding current to reach a predetermined intensity.

2. In a method for resistance welding with a welding current induced by interruption of a circuit supplying a current to an electromagnetic storage system, the step of applying to the terminals of said storage system, upon interruption of the supply circuit, an electromotive force opposite to and of a value exceeding that of the electromotive force of the storage system to first accelerate the diminution of the initial current flowing in the storage system and, after elimination of said initial current, to create an inversely flowing current.

3. A spot welding apparatus, comprising an electromagnetic storage system including a primary winding and a secondary winding, a pair of welding electrodes connected to said secondary winding, a circuit for supplying direct current to said primary winding, a switch to break said supply circuit, and means to apply to the terminals of said primary winding, upon breaking of said supply circuit, an electromotive force opposite to that of the electromotive force of the storage system.

4. An apparatus, as claimed in claim 3, in which said means to apply to the primary winding of said electromagnetic storage system an electromotive force opposite to that of the electromotive force of said system includes an auxiliary electric storage system adapted to be charged while said supply circuit is closed and to discharge into said electro-magnetic system upon interruption of said supply circuit.

5. A spot welding apparatus, comprising a first electro-magnetic storage system including a soft iron core, a primary winding, and a secondary winding, both wound upon said core, a pair of welding electrodes connected to said secondary winding, a source of direct current, a supply circuit connecting said source to said primary winding, a second electro-magnetic storage system including a soft iron core and a single exciting winding wound upon said core, said last-mentioned winding being connected in parallel into said supply circuit, and means to disconnect said primary winding of the first storage system and said single winding of the second storage system from said source of current, without disconnecting said single winding from said primary winding.

6. A spot welding apparatus, comprising an electro-magnetic storage system including a soft iron core, a primary winding, and a secondary winding, both wound upon said core, a pair of welding electrodes connected to said secondary winding, a source of low voltage direct current, a supply circuit connecting said low voltage source to said primary winding, a high voltage condenser arrangement, a source of high voltage direct current for charging said condenser arrangement, and means to disconnect simultaneously the primary winding of said storage system from said source of low voltage direct current and the condenser arrangement from its high voltage source, and to connect said condenser immediately with the primary winding of said electromagnetic storage system.

DAVID SCIAKY.